US012602276B2

(12) United States Patent
Shebey, III et al.

(10) Patent No.: US 12,602,276 B2
(45) Date of Patent: Apr. 14, 2026

(54) DYNAMIC REGISTRATION OF SOFTWARE COMPONENTS FOR DIAGNOSIS OF ROOT CAUSE OF FAILURE

(71) Applicant: INTERNATIONAL BUSINESS MACHINES CORPORATION, Armonk, NY (US)

(72) Inventors: John Charles Shebey, III, Highland, NY (US); Laura Sperling, Poughkeepsie, NY (US); Walter A. Manrique, Poughkeepsie, NY (US); Madhana Sunder, Meridian, ID (US); James A. O'Connor, Ulster Park, NY (US); Robert M. Abrams, Wappinger Falls, NY (US); Ralph Sharpe, Newburgh, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/987,788

(22) Filed: Nov. 15, 2022

(65) Prior Publication Data

US 2024/0160518 A1    May 16, 2024

(51) Int. Cl.
*G06F 11/00*        (2006.01)
*G06F 11/07*        (2006.01)
(Continued)

(52) U.S. Cl.
CPC ........ *G06F 11/079* (2013.01); *G06F 11/0721* (2013.01); *G06F 11/3476* (2013.01);
(Continued)

(58) Field of Classification Search
CPC .............. G06F 11/079; G06F 11/0721; G06F 11/0778; G06F 11/3476; G06F 11/366; G06F 11/3668; G06N 20/00
See application file for complete search history.

(56) References Cited

U.S. PATENT DOCUMENTS 3,543,392  A    12/1970  Bomkamp et al.
5,682,523  A    10/1997  Chen et al.
(Continued)

FOREIGN PATENT DOCUMENTS

CA        938911 A2    12/1973
CN     120188147 A     6/2023
(Continued)

OTHER PUBLICATIONS

Alonso et al., Predicting Software Anomalies using Machine Learning Techniques, IEEE, 2011 IEEE 10th International Symposium on Network Computing and Applications, DOI: 10.1109/NCA.2011. 29, Date Added to IEEE Xplore: Oct. 10, 2011, 8 pages.
(Continued)

*Primary Examiner* — Elmira Mehrmanesh

(74) *Attorney, Agent, or Firm* — Onyx IP Group

(57)        ABSTRACT

Dynamic registration of software components for root cause of failure diagnosis may include determining a start of execution of a thread associated with a process, and creating a dynamic registry associated with the thread. One or more software components associated with execution of the thread are determined, and an entry in the dynamic registry is created for each of the one or more software components. The entry includes an identifier of the software component and a diagnostic content indicator associated with the software component. The diagnostic content indicator indicates component-specific diagnostic information associated with the software component.

19 Claims, 5 Drawing Sheets

(51) Int. Cl.

| | | |
|---|---|---|
| *G06F 11/34* | (2006.01) | |
| *G06F 11/362* | (2025.01) | |
| *G06F 11/3668* | (2025.01) | |
| *G06N 20/00* | (2019.01) | |

(52) U.S. Cl.

CPC ........ *G06F 11/366* (2013.01); *G06F 11/3668* (2013.01); *G06F 11/0778* (2013.01); *G06N 20/00* (2019.01)

(56) References Cited

U.S. PATENT DOCUMENTS

| | | | |
|---|---|---|---|
| 5,819,094 | A | 10/1998 | Sato et al. |
| 7,716,429 | B2 * | 5/2010 | Reed ................... G06F 11/3495 |
| | | | 711/154 |
| 7,886,281 | B2 | 2/2011 | Smith et al. |
| 8,166,313 | B2 | 4/2012 | Fedtke |
| 8,732,681 | B2 | 5/2014 | Sale et al. |
| 8,756,461 | B1 * | 6/2014 | Jacob ................. G06F 11/3636 |
| | | | 714/45 |
| 8,812,443 | B2 | 8/2014 | Dewey et al. |
| 8,863,091 | B2 | 10/2014 | Dageville et al. |
| 9,081,898 | B1 | 7/2015 | Antova et al. |
| 10,198,343 | B2 | 2/2019 | Rehman et al. |
| 10,324,823 | B2 | 6/2019 | Davis et al. |
| 10,657,027 | B2 | 5/2020 | Mulder et al. |
| 11,157,373 | B2 | 10/2021 | Alcorn et al. |
| 11,194,648 | B2 | 12/2021 | Sczepczenski et al. |
| 11,307,922 | B2 | 4/2022 | Koropoff |
| 2004/0123274 | A1 | 6/2004 | Inagaki et al. |
| 2008/0066069 | A1 * | 3/2008 | Verbowski ............ G06F 21/552 |
| | | | 718/102 |
| 2013/0111450 | A1 * | 5/2013 | Munster .............. G06F 11/3612 |
| | | | 717/127 |
| 2014/0026002 | A1 * | 1/2014 | Haines ................ G06F 11/0769 |
| | | | 714/57 |
| 2015/0026238 | A1 * | 1/2015 | Natarajan .......... G06F 11/3006 |
| | | | 709/203 |
| 2017/0242743 | A1 * | 8/2017 | Miller ................. G06F 11/0709 |
| 2018/0024876 | A1 | 1/2018 | Addison et al. |
| 2020/0133761 | A1 * | 4/2020 | Paruthi .............. G06F 11/0751 |
| 2021/0019219 | A1 * | 1/2021 | Patel .................... G06F 9/5066 |
| 2021/0173760 | A1 * | 6/2021 | Downie ............. G06F 11/3698 |

FOREIGN PATENT DOCUMENTS

| | | | |
|---|---|---|---|
| EP | 4552018 | A1 | 5/2025 |
| JP | S5130312 | B1 | 8/1976 |
| RU | 2628921 | C1 | 8/2017 |
| RU | 2637997 | C1 | 12/2017 |
| RU | 2673711 | C1 | 11/2018 |
| WO | 03065179 | A3 | 11/2003 |
| WO | 2024/104682 | A1 | 5/2024 |

OTHER PUBLICATIONS

International Search Report and Written Opinion, PCT/EP2023/078779, mailed Jan. 19, 2024, 16 pages.

* cited by examiner

300

500

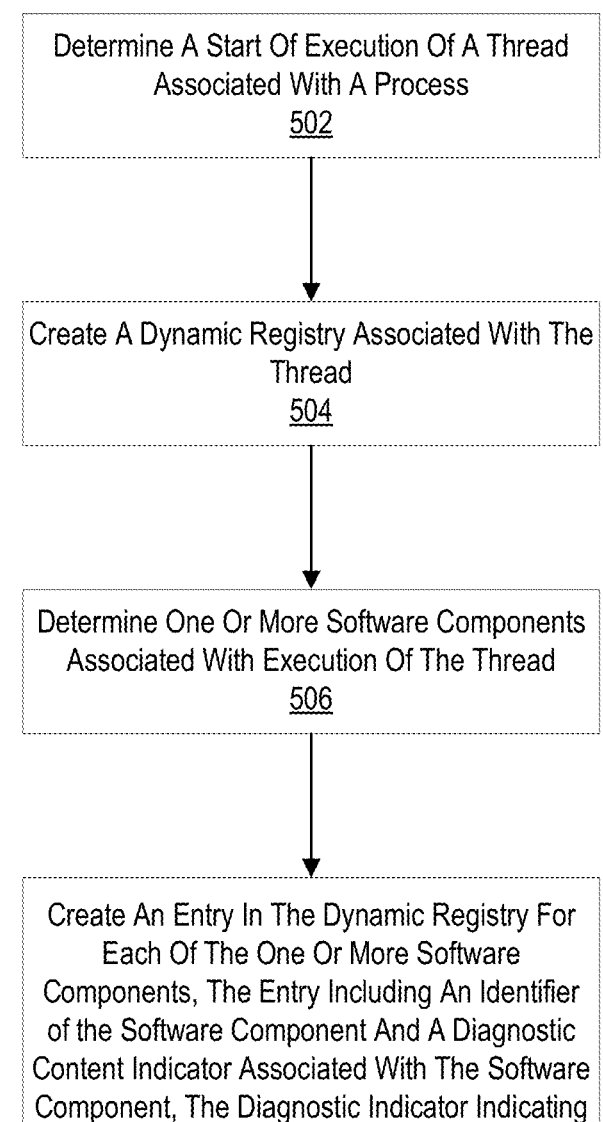

Determine A Start Of Execution Of A Thread Associated With A Process
502

Create A Dynamic Registry Associated With The Thread
504

Determine One Or More Software Components Associated With Execution Of The Thread
506

Create An Entry In The Dynamic Registry For Each Of The One Or More Software Components, The Entry Including An Identifier of the Software Component And A Diagnostic Content Indicator Associated With The Software Component, The Diagnostic Indicator Indicating Component-Specific Diagnostic Information Associated With The Software Component
508

FIG. 5

DYNAMIC REGISTRATION OF SOFTWARE COMPONENTS FOR DIAGNOSIS OF ROOT CAUSE OF FAILURE

BACKGROUND

Field of the Invention

The field of the invention is data processing, or, more specifically, methods, apparatus, and products for dynamic registration of software components for diagnosis of root cause of failure.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

As computer systems and associated computer programs become increasingly complex, diagnosing failures and other faults in computer programs becomes more challenging. To understand the challenges associated with fault isolation and diagnosis for large complex application environments, some background and definitions associated with terminology such as programs, processes, threads, and dumps is provided. A program is a set of instructions intended to fulfill a certain task. A process is a program instance that is executed along with any resources needed for the program instance to operate. The operating system (OS) handles the tasks of managing the resources needed to turn the program into a running process. A single program may have multiple instances in which each instance of the running program is a process. Typically, each process has a separate memory address space in which the process runs independently. Typically, each process is isolated from other processes and cannot directly access data in other processes. A thread is a single unit of work or flow of control that runs in a process. A single-threaded process contains one thread such that the process and the thread are one and the same. Accordingly, a single task is being performed at a time. A multi-threaded process contains more than one thread and the process performs multiple tasks at the same time. A dump is a snapshot of memory associated with one or more processes and typically includes program code, system-related control blocks, process-related control blocks, and other storage areas.

When a software problem occurs, software that collects first failure data about events and conditions that might lead to a failure is often relied upon to collect data necessary to diagnose the problem. The specific data needed to understand and resolve the problem can differ greatly depending on the particular failure scenario. For example, a computer system may be executing hundreds or thousands of processes and threads simultaneously. A failure is often confined to a subset of processes and threads while the rest of the computer system continues to run unimpaired. In worst case scenarios, nothing is obviously broken, but the system or production applications may be sluggish or unresponsive. Collecting "all" of the data on the computer system at the time of failure, such as using a full memory dump, is impractical and may require a system outage. A full system outage is often not a preferable option for clients running business-critical applications requiring ultra-high availability. Accordingly, it is important to be able to identify and limit the specific first failure data that needs to be collected at the time of the failure without impacting the system's availability. System data dumps are often captured, but they don't always have all of the data necessary to debug and diagnose a root case of the failure. In such cases, the client must often recreate the circumstances of the failure to gather additional information which can be time-consuming and result in repeated outages. In some cases, such recreates may take months or years of time to complete. In other instances, clients may be unable to recreate the failure scenario, leaving the problem undiagnosed. Hence, a novel solution for the collection of the necessary documentation for diagnosing the root cause of a failure is needed.

SUMMARY

Apparatus and methods for dynamic registration of software components for root cause of failure diagnosis according to various embodiments are disclosed in this specification. An embodiment of a method includes determining a start of execution of a thread associated with a process, and creating a dynamic registry associated with the thread. One or more software components associated with the execution of the thread are determined, and an entry in the dynamic registry is created for each of the one or more software components. The entry includes an identifier of the software component and a diagnostic content indicator associated with the software component. The diagnostic indicator indicates component-specific diagnostic information associated with the software component.

In an embodiment, the method further includes determining that execution of the thread is completed, and deleting the dynamic registry associated with the thread. In another embodiment, the method further includes determining that a triggering event associated with the thread has occurred, collecting diagnostic data for at least one of the one or more software components based on the diagnostic content indicator associated with software component, and storing dump information including the collected diagnostic data in a central repository.

In another embodiment, collecting diagnostic data for at least one of the one or more software components comprises collecting diagnostic data for a subset of the one or more software components. In another embodiment, the subset is determined based upon a prioritization scheme. In another embodiment, the triggering event includes a failure during execution of the thread. In another embodiment, the diagnostic data further includes one or more of hardware diagnostic information or console logs. In another embodiment, the triggering event includes an anomaly during execution of the thread. In another embodiment, the anomaly is determined based on an artificial intelligence analysis and prediction.

In another embodiment, the entry in the dynamic registry for each of the one or more software components further includes an active or inactive status of the software component. In another embodiment, the diagnostic information is collected only for the software components that include an active status. In another embodiment, an active status is set for a software component based on a function call of the software component by the thread. In another embodiment, an inactive status is set for a software component based on a return of a function call to the software component by the thread.

An embodiment includes a computer system. The computer system includes a processor, a computer-readable memory, and a computer-readable storage device, and program instructions stored on the storage device for execution by the processor via the memory.

An embodiment includes a computer usable program product. The computer usable program product includes a computer-readable storage device, and program instructions stored on the storage device.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 5 sets forth a flow chart illustrating another exemplary method for dynamic registration of software components for root cause of failure diagnosis according to embodiments of the present disclosure.

DETAILED DESCRIPTION

Figure 1:
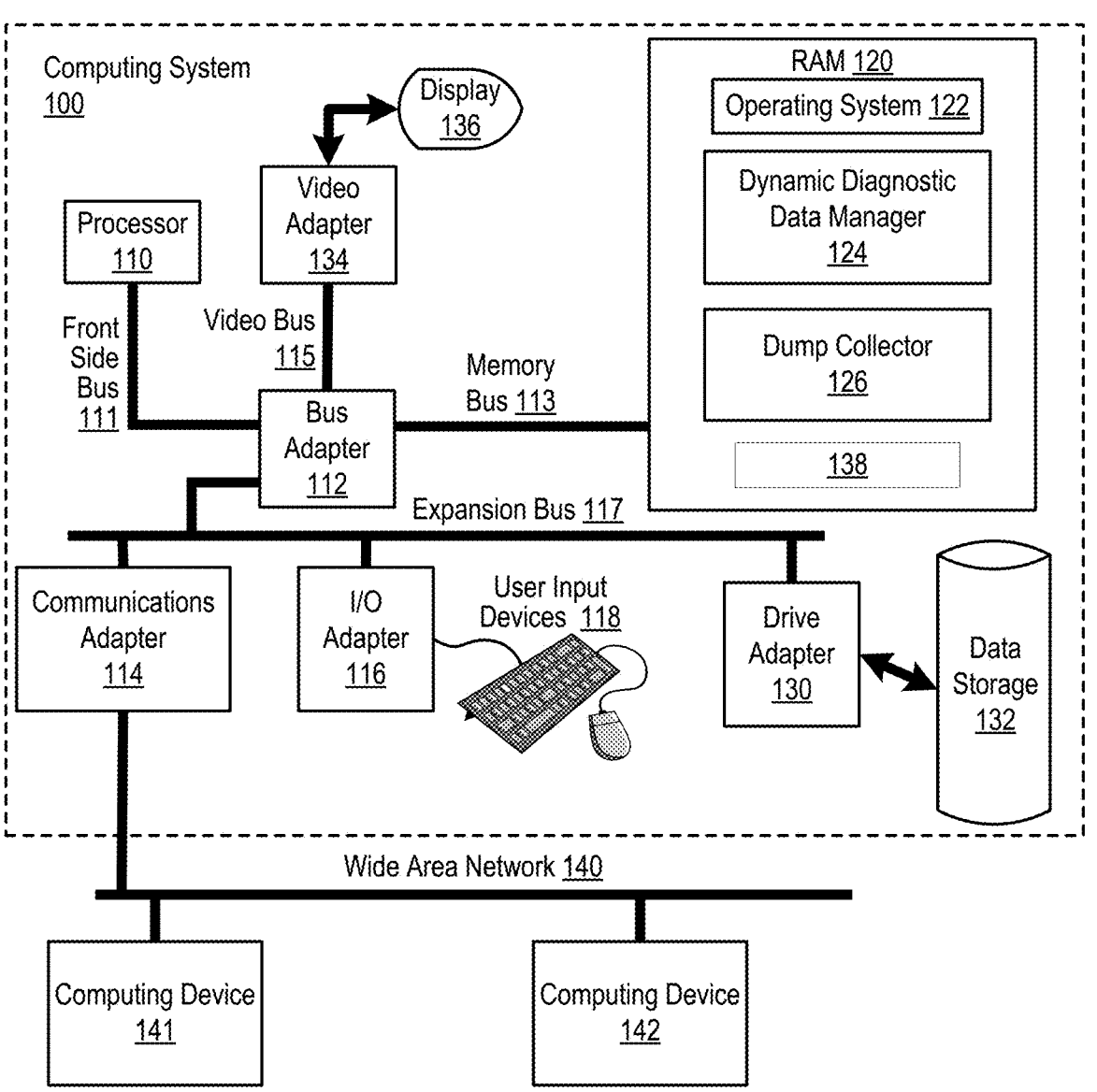
FIG. 1 is a block diagram of an exemplary computing system configured for dynamic registration of software components for diagnosis of root cause of failure in accordance with embodiments of the present disclosure.

Exemplary methods, apparatus, and products for dynamic registration of software components for diagnosis of root cause of failure in accordance with the present invention are described with reference to the accompanying drawings, beginning with FIG. 1. FIG. 1 sets forth a network diagram of a system-configured dynamic registration of software components for root cause of failure diagnosis in accordance with embodiments of the present disclosure. FIG. 1 shows a block diagram of automated computing machinery that comprises an exemplary computing system 100 that includes at least one computer processor 110 or 'CPU' as well as random access memory (RAM) 120 which is connected through a high-speed memory bus 113 and bus adapter 112 to processor 110 and to other components of the computing system 100.

Stored in RAM 120 is an operating system 122. Operating systems useful in computers configured for dynamic registration of software components for diagnosis of root cause of failure according to embodiments of the present disclosure include UNIX™, Linux™, Microsoft Windows™, AIX™, and others as will occur to those of skill in the art. The operating system 122 in the example of FIG. 1 is shown in RAM 120, but many components of such software typically are stored in non-volatile memory also, such as, for example, on data storage 132, such as a disk drive. The RAM 120 further stores a dynamic diagnostic data manager component 124 and a dump collector component 126 as will be further described below.

The computing system 100 of FIG. 1 includes disk drive adapter 130 coupled through expansion bus 117 and bus adapter 112 to processor 110 and other components of the computing system 100. Disk drive adapter 130 connects non-volatile data storage to the computing system 100 in the form of data storage 132. Disk drive adapters useful in computers configured for inserting sequence numbers into editable tables according to embodiments of the present disclosure include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art. The dynamic diagnostic data manager component 124 is configured to create, store, and maintain a dynamic data registry 138 for each thread in RAM 120. The dynamic data registry 138 contains an entry for each component indicating which diagnostic data to collect for that thread. One or more dynamic data registries will be used by the dump collector component 126 for root cause of failure diagnosis as further described herein.

The example computing system 100 of FIG. 1 includes one or more input/output ('I/O') adapters 116. I/O adapters implement user-oriented input/output through, for example, software drivers and computer hardware for controlling output to display devices such as computer display screens, as well as user input from user input devices 118 such as keyboards and mice. The example computing system 100 of FIG. 1 includes a video adapter 134, which is an example of an I/O adapter specially designed for graphic output to a display device 136 such as a display screen or computer monitor. Video adapter 134 is connected to processor 110 through a high speed video bus 115, bus adapter 112, and the front side bus 111, which is also a high speed bus.

The exemplary computing system 100 of FIG. 1 includes a communications adapter 114 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for inserting sequence numbers into editable tables according to embodiments of the present disclosure include modems for wired dial-up communications, Ethernet (IEEE 802.3) adapters for wired data communications, and 802.11 adapters for wireless data communications.

The communications adapter of FIG. 1 is communicatively coupled to a wide area network (WAN) 140 that also includes other computing devices, such as computing devices 141 and 142 as shown in FIG. 1. In particular embodiments, the computing system 100 includes a server and computing devices 141 and 142 are client devices of the server.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Existing solutions for root cause of failure diagnosis require a substantial manual process with limited automatic collection of complete diagnostic data for complex problem debugging. This is often an error-prone time-consuming process in which diagnostic data is collected and analyzed relative to code flows. Often, consultation with subject matter experts is needed. If the problem source is inconclusive, returning to the client for additional problem determination actions which include gathering of additional diagnostic data is needed as well as recreation of the problem. This process must often be repeated until the problem is solved. In addition, collecting a stand-alone dump of all information requires a reboot of the system which is not often an option for high-availability clients and is a time-consuming process.

System dumps are typically collected by recovery routines, Serviceability Level Indication Processing (SLIP) traps, and manually via the console. However, these existing dump collection methods pose challenges. Recovery dumps may not contain all necessary data due to recovery routines having limited visibility to component interactions. Recovery routines are often not aware of all other components in a flow and the interactions between the components. In addition, complex situations exist involving multiple components in which critical information is missed in the recovery dump. This results in situations in which the issue cannot be resolved. Recovery routines may be capable of recognizing the data that needs to be dumped for their own component, but do not always recognize the data that needs to be dumped for other components in a failing flow for which they are unaware. SLIP dumps may not contain all necessary data due to the limited knowledge of the users. SLIP dumps are driven by human specification of an (often complex) set of keywords specifying data content, which is often determined without full knowledge of the problem flow and interactions. Complex situations involving multiple components exist in which critical information is missed in the SLIP dump. As a result, additional recreations of the failure are necessary to establish an understanding of the root cause of the failure. For a persistent process-related condition such as a loop, high CPU usage, or a hang condition, a console dump may be manually collected by an operator. Similar to SLIP dumps, console dumps are operator-specified, often based on incomplete knowledge of the problem flow and interactions.

One or more embodiments provide for dynamic registration of software components for root cause of failure diagnosis. In an embodiment, a smart diagnostic unified management protocol (SDUMP) is provided to enable the collection of the necessary documentation for a problem flow including one or more software components to diagnose the root cause of a failure. Various embodiments provide for a dynamic registration facility that enables the collection of all necessary documentation for a problem flow involving one or more application, middleware and operating system components to diagnose root cause of failure. In various embodiments, as a thread executes through a workflow, components of that workflow (e.g., applications, middleware, or operating system components) are dynamically registered. Each registry entry includes an identification of the component and its associated diagnostic content indicator describing the data that is to be collected if a problem occurs. In one or more embodiments, the registry entry includes an identifier of the software component, a diagnostic content indicator associated with the software component, and a state that reflects whether the component is active (registered) or inactive (unregistered) in the execution flow. In one or more embodiments, the diagnostic content indicator points to an array of component-specific areas which would provide relevant diagnostic data.

In accordance with various embodiments, the dynamic diagnostic data manager component 124 maintains the dynamic data registry 138 to keep track of all of the software components in a problem flow. Initially, when a thread is created, the software component responsible for the thread's creation anchors a dynamic registry for the specific thread via the dynamic diagnostic data manager component 124. The dynamic registry for the thread is used to keep track of all software components in an execution flow using separate entries for each component in the execution flow. During normal processing, when a software component is added to the execution flow, the respective component's entry within the thread's registry is marked active. Once the software component is no longer active in the execution flow, the entry associated with the software component is marked inactive within the thread's registry. During thread completion, the registry for the respective thread is deleted.

In particular embodiments, registration of components is based on execution of a system call or service (e.g., a program call or recovery routine).

One or more embodiments provide for a dynamic registry that allows for a real-time view of the software components involved with a thread's flow at any diagnostic time of interest. In various embodiments, the dynamic registry facilitates First Failure Data Capture (FFDC) relevant to the involved software components during abnormal events such as thread failures or persistent process conditions (e.g., loops, hangs, or other abnormalities) to aid a debugger in problem determination without requiring recreation of the conditions at the time of the abnormality (i.e., a recreate).

In accordance with various embodiments, the dynamic diagnostic data manager component 124 provides the facilities for each active thread of a process to activate, maintain, and eventually deactivate its own unique dynamic registry entry. Each software component encountered along the thread's flow will register itself. In one or more embodiments, the dynamic registry entry for each component further includes a diagnostic content indicator (or diagnostic level) used to indicate which component-specific data would best aid in problem determination during that specific part of the flow. In one or more embodiments, the dynamic registry entry includes an indication of whether the software component is in an active status or inactive status. In response to a triggering event (such as a failure or fault during execution of a thread, or request of a dump) the dump collector component 126 queries the dynamic registry for the thread to collect information of all the active component entries and their associated diagnostic content indicators to add the corresponding data into the data dump. In other embodiments, the triggering event includes an anomaly during execution of the thread. In particular embodiments, the process(es) identified as contributing to an anomaly is determined based on artificial intelligence (or knowledge based) analysis and/or prediction. In various embodiments, an anomaly includes not only specific hardware or software failure which are detected by server hardware of software, but also includes, for example, an odd incongruity or inconsistency, a peculiar or strange condition, or a situation that will likely result in abnormal behavior of the computer system such as delays, contention, resource exhaustion, or outright failure.

In another embodiment, the diagnostic information is collected only for the software components that are in an active status. In another embodiment, an active status is set for a software component based on a function call of the software component by the thread. In another embodiment, an inactive status is set for a software component based on a return of a function call from the software component by the thread. In an embodiment, when a currently active component is deactivated at the return from a function call, or other means, the deactivation is recorded in the dynamic registry.

In an embodiment, the dynamic registry is used to enable the collection of diagnostic data in anomaly scenarios where the trigger event is not an explicit failure, but is identified as a result of higher level (e.g., artificial intelligence or machine learning based) anomaly prediction and/or analysis.

In one or more embodiments, software components activated by a function call or other means associated with a particular thread are automatically identified and tracked. In such embodiments, a first software component, when activated, registers in a thread-specific dynamic software registry. Each other software component accessed or activated by the first software component registers in the thread-specific dynamic software registry when it is first accessed or activated. A trigger event produces and captures a snapshot of all the active software components in the dynamic software registry. The snapshot is used to capture and save all dump information associated with all active components associated with the event trigger. In particular embodiments, the snapshot of all active software components at the time of a trigger event is saved in a central repository. In other embodiments, additional diagnostic data is also collected in the event of a trigger other than just dump information such as additional hardware diagnostic information or console logs.

In particular embodiments, persistent process conditions may require a diagnostic view of all threads within a process. In such cases, the dump collector component 126 can query each thread's dynamic registry as described above and then merge all of the corresponding requested data into the dump.

In addition to process or thread failures, anomalies are scenarios in which continued normal operating behavior can lead to delays, contention, or resource exhaustion. In these scenarios, the system appears to be operating, but is plagued by delays or other issues that can eventually cause system failure. Typically, operations or system programming staff analyze the situation. If a software component is believed to be at fault, FFDC may be required in these situations as well. Prior to taking corrective action, the operator may request a "console dump" where the dynamic data registry 138 may assist in ensuring that the correct diagnostic data is captured for the anomaly automatically.

In one or more embodiments, the dynamic diagnostic data manager component 124 starts at system initialization and remains active until system termination. The dynamic diagnostic data manager component 124 is responsible for managing the content of the dynamic registry structure. In particular embodiments, the dynamic diagnostic data manager component 124 provides application programming interfaces (APIs) for lifecycle management including activation, deactivation, and dynamic modification of each player's component (or product's) entry. In accordance with various embodiments, a "player" refers to a representation of a subsystem/system component. In particular embodiments, each player is provided with an index to view and modify its dynamic registry entry. At system initialization, the dynamic diagnostic data manager component 124 allocates enough space for each existing player to have an entry in the dynamic registry structure of the dynamic data registry 138, which determines the total size of the dynamic registry structure to be added as the dynamic data registry 138 for each thread.

In particular embodiments, the dynamic diagnostic data manager component 124 implements the following APIs with the following associated functions:

NewPlayer—Dynamically adds a new player to the dynamic registry structure and allocatesa larger dynamic registry structure for new threads.

Activate—Enables a player's diagnostic data to be dumped when the player is engaged, and includes the player's diagnostic content indicator.

Deactivate—Disables a player's entry once it is disengaged from a thread's flow.

ModifyIndicator—Updates the player's diagnostic content indicator.

QueryThreadDiagnosticData—Invoked by the dump collector component 126 to query which data should be dumped from each engaged player based on the diagnostic content indicator under a target thread.

In one or more embodiments, the dynamic diagnostic data manager component 124 implements the following rules to govern the behavior of dynamic registry interactions:

LIFECYCLE RULES: Used during the lifecycle of a thread

1. A dynamic registry structure is created and anchored to the thread when the thread begins execution.

2. A dynamic registry structure entry is marked active when a player (e.g., a component) registers (e.g., issues Activate).

3. A dynamic registry structure entry is marked inactive when a player (e.g., a component) deregisters (e.g., issues Deactivate), and is managed in an efficient manner for performance reasons.

4. The dynamic registry structure is deleted when the thread terminates.

REGISTRATION RULES: Used during player registration

1. A called player registers itself as active when it is about to:

a. perform work on a separate thread on the current thread's behalf b. begin executing code in another memory space (e.g., after a PC routine in z/OS).

c. request an internal serialization resource (e.g., a lock, a latch, or ENQ in z/OS).

d. seta failing return code to pass back to its caller and mark itself permanent (e.g., life of thread). This is for the case in which a bad return code leads to some cascading condition resulting in, for example, a hang, loop, Sick But Not Dead (SBND), or abend code, where a dump will eventually be requested.

e. establish a recovery routine (e.g., ESTAE or FRR in z/OS or CDT in AIX).

2. During subsystem creation, the subsystem's creator (e.g., z/OS UNIX, Db2, IMS, CICS) registers itself.

DEREGISTRATION RULES: Used during player deregistration to make itself inactive

1. During subsystem deletion:

a. When disconnecting from a major subsystem, the subsystem is aware of this completed/terminated connection and deregisters itself.

REGISTRY MODIFICATION RULES: Used during registry modification

1. Updates the diagnostic content indicator when a player wants to add additional diagnostic data or remove existing diagnostic data to be included in the dump.

a. Add data (for example, while working with different address spaces and associated dataspaces in z/OS) when relevant in the workflow.

b. Remove data when no longer relevant in the workflow.

In particular embodiments, players are responsible for defining their list of diagnostic content indicators and associated diagnostic data to be collected.

Example embodiment of a dynamic registry structure (DynRegStructure):

the present disclosure. A process 301 includes a plurality of active threads (Thread 1 to Thread n) 302. Each of the active threads 302 creates, anchors, maintains, and eventually deletes its own unique dynamic registry 304. In a particular embodiment, the procedure 300 is facilitated by the dynamic diagnostic data manager component 124 which provides an interface between a particular thread 302 and the thread's dynamic registry 304. Each of the software components encountered along the flow of a specific thread 302 activates its entry or deactivates its entry and adjusts the associated diagnostic content indicator within the particular dynamic registry 304 associated with the particular thread 302. The diagnostic content indicator points to an array of component-specific data that would best aid in problem determination during the specific part of the flow. Accordingly, each dynamic registry 304 may include registry entries corresponding to a plurality of software components (e.g., component 1 to component n) encountered within an active thread. While registered in the dynamic registry 304, a software component can change its diagnostic content indicator to reflect a changed diagnostic level associated with the software component or deactivate the entry when the component is no longer relevant to the flow.

At a time 306 in which a dump of one of the threads 302 is requested, for example by a user or automatically, the dump collector component 126 queries the thread's dynamic registry 304 to read and/or archive (308) the registry to collect information regarding the registered component entries of the thread's dynamic registry 304 and the asso-

```
DynRegStructure
  1 Header information
    2 ThreadPtr            /* thread pointer */
    2 Process Ptr          /* process pointer */
  1 DynRegPlayer(nnn)              /* an array of entries for each component/subsystem */
    2 DynRegEntryId               /* unique identifier for player */
    2 DynRegEntryFlagActive bit(1) /* This player is engaged and needs to be dumped*/
    2 DynRegEntryIndicatorValue bit(4) /*Diagnostic content indicator (string/integer)
    2 DynRegEntryIndicatorPtr     /*Ptr to Player list of data to be collected at dump time */
```

Figure 2:
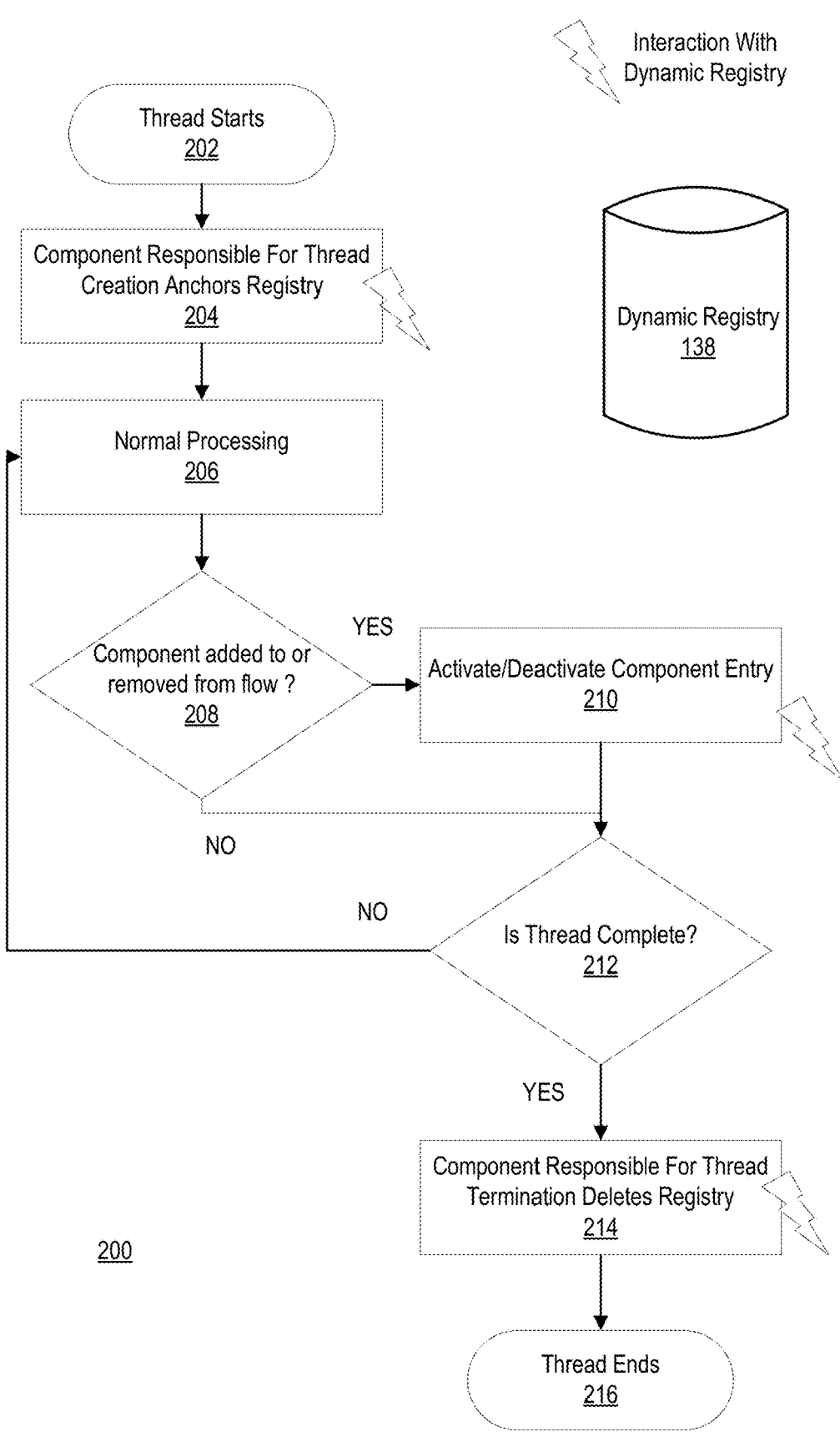
FIG. 2 sets forth a flow chart illustrating an exemplary method for dynamic registration to track software components over the lifecycle of a thread for root cause of failure diagnosis according to embodiments of the present disclosure.

FIG. 2 sets forth a flow chart illustrating an exemplary method 200 for dynamic registration to track software components over the lifecycle of a thread for diagnosis of root cause of failure according to embodiments of the present disclosure. The method 200 includes the start of a thread (202) where the component responsible for thread creation anchors (204) a dynamic data registry 138 for the thread in RAM 120. In particular embodiments, the entry in the dynamic data registry 138 includes an identifier of the software component, a diagnostic content indicator associated with the software component, and a state that reflects whether the component is active (registered) or inactive (unregistered) in the execution flow. The thread then continues normal processing (206).

During the normal processing (206) of the thread, new components may be either added to or removed from the execution flow (208). When a component is executing, the component decides whether to activate or deactivate (210) its component entry in the thread's dynamic registry. If the thread is not complete, the method continues with normal processing (206) of the thread. If the thread is complete (212), the component responsible for thread termination deletes (214) the dynamic data registry 138 associated with the thread. The thread then ends (216).

Figure 3:
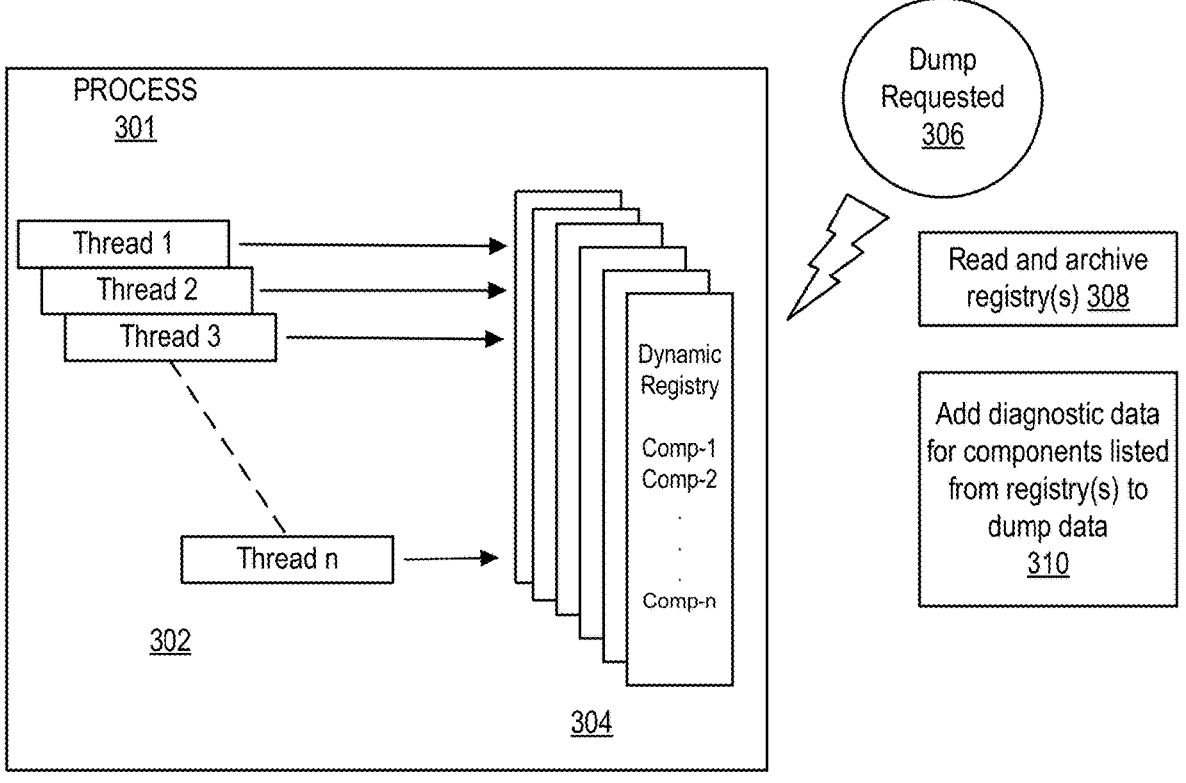
FIG. 3 illustrates an exemplary procedure for diagnosis of root cause of failure according to embodiments of the present disclosure.

FIG. 3 illustrates an exemplary procedure 300 for diagnosis of root cause of failure according to embodiments of ciated diagnostic content indicator to add the corresponding data to the dump. The dump collector component adds (310) the diagnostic data for components listed from the dynamic registry(s) 304 to the dump data. In a particular embodiment, the dump collector component 126 archives a copy of the dynamic registry 304 for later examination in a repository. Persistent process conditions may require a diagnostic view of all threads within a process. In such cases, the dump collector component 126 queries each thread's dynamic registry 304 and merges the corresponding requested data into the dump.

Figure 4:
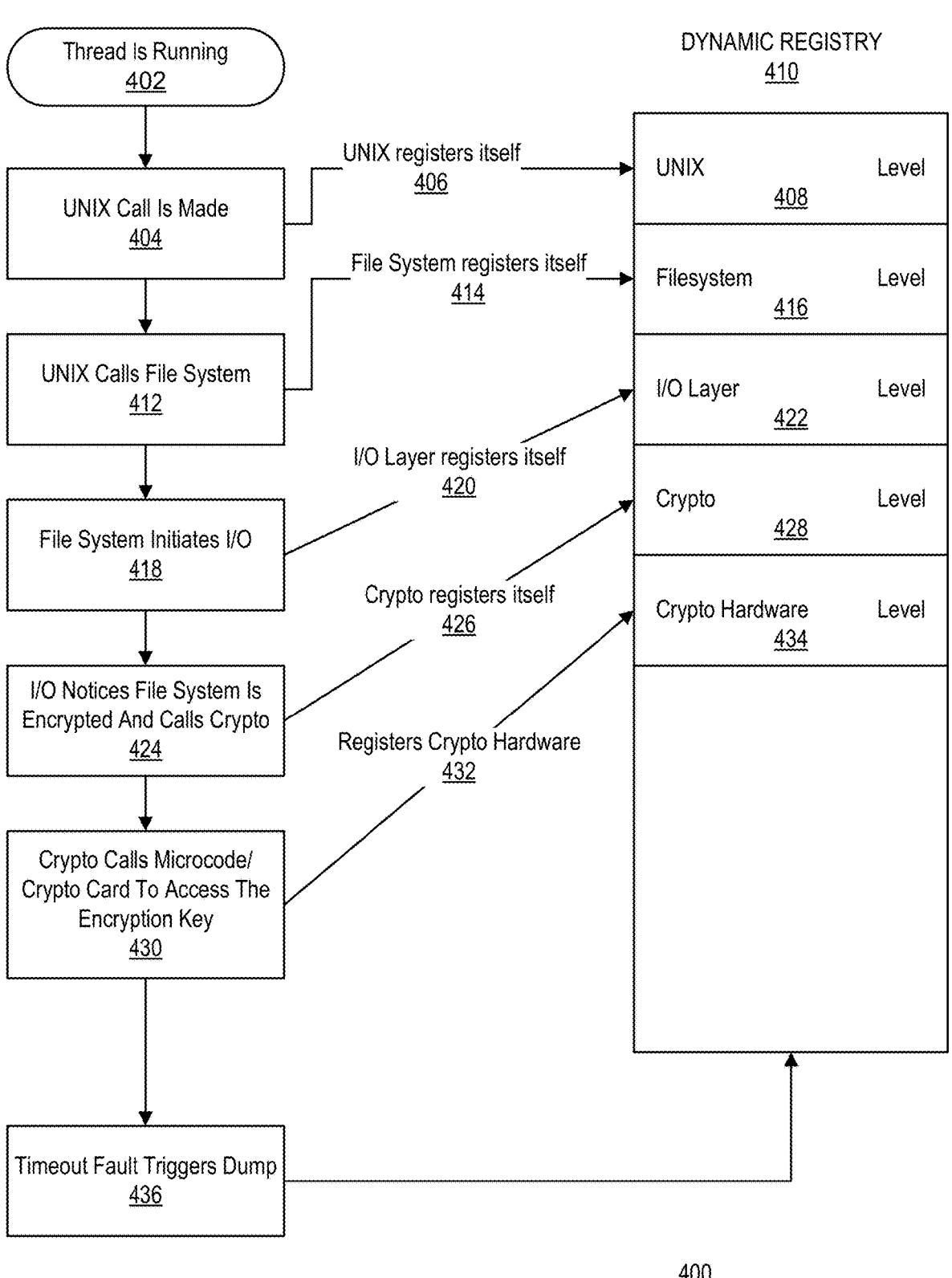
FIG. 4 illustrates an example of a specific flow utilizing dynamic registration of software components for root cause of failure diagnosis according to embodiments of the present disclosure.

FIG. 4 illustrates an example of a specific flow 400 utilizing dynamic registration of software components for root cause of failure diagnosis according to embodiments of the present disclosure. In a first example scenario utilizing a dynamic registry as described with respect to various embodiments, a running thread 402 attempted to perform an operation against an encrypted file system. While the cryptographic software component was waiting for a response from cryptographic hardware, an asynchronous time-out failure occurred on the thread, and the timeout fault triggered requesting a dump (436). The dump collector component 126 queried the failing thread's dynamic registry 410 to collect data indicated by the diagnostic level (or diagnostic content indicator) associated with each registered component in the dynamic registry 410, and added that data to the dump.

Examination of the thread's dynamic registry 410 at the moment of the time-out shows that a UNIX component 404 made a request call to read a file has caused the UNIX component 404 to register itself (406) in a first entry 408 in the dynamic registry 410 with a diagnostic level (or diagnostic content indicator) of 1 indicating to dump all storage associated with UNIX-specific data. Next, the UNIX component 404 called a file system component 412 and the file system component registered itself (414) in its entry 416 in the dynamic registry 410 with a diagnostic content indicator of 1 indicating to dump all file system-specific data. The file system component 412 initiated I/O operations as part of the read request. The I/O component 418 registered itself (420) in its entry 422 in the dynamic registry 410 with a diagnostic content indicator of 1. The I/O component 418 noticed that the file system of the target data was encrypted and invoked a cryptographic component 424 for decryption. The cryptographic component 424 registered itself (426) in its entry 428 in the dynamic registry 410 with a diagnostic content indicator of 1 indicating to dump storage related to the requested operation. When the cryptographic component 424 was about to send the decryption request to cryptographic hardware component 430 to access the encryption key, the cryptographic component 424 modified its diagnostic content indicator to 2 to ensure that the data associated with the hardware request would also be dumped. Additionally, the cryptographic component 424 registered (432) the cryptographic hardware component 430 in a fifth entry 434 in the dynamic registry 410 with a diagnostic content indicator of 1 indicating to gather cryptographic hardware logs. The resulting dump obtained by the dump collector component 126 contained the requested FFDC along with data specifically requested by a recovery routine.

In a second example scenario not utilizing a dynamic registry 410 as described with respect to various embodiments, the thread 402 again attempted to perform a read operation against an encrypted file, and again an asynchronous time-out occurred while the cryptographic component 424 was awaiting a response from the cryptographic hardware component 430. The dump collector component 126, not having a dynamic registry to query, relies on the cryptographic component's recovery routine to identify which data to include in a dump. The cryptographic component 424 will direct the dump collector component 126 to collect the cryptographic component's relevant data in the dump, and the dump collector component 126 may also capture both the thread-specific data and its caller's data (e.g., I/O component data). However, the dump collector component 126 will not know to collect any UNIX or file system data, nor will it be able to collect cryptographic hardware logs. Since the cryptographic hardware component is causing the delay, a user or operator will need to manually request hardware logs from hardware colleagues and hope that the logs are still available. A recreate procedure requesting a dump with additional data, along with a timelier manual request of hardware logs, may be needed to understand root cause of the failure.

In a third example scenario, some components are participating in the dynamic registry 410, but others are not. In this scenario, data is collected based on a combination of the diagnostic level of the participating components and the data requested by the recovery routine.

For further explanation, FIG. 5 sets forth a flow chart illustrating another exemplary method 500 for dynamic registration of software components for root cause of failure diagnosis according to embodiments of the present disclosure. The method 500 includes determining (502) a start of execution of a thread associated with a process, and creating (504) a dynamic registry associated with the thread. The method 500 further includes determining (506) one or more software components associated with execution of the thread, and creating (508) an entry in the dynamic registry for each of the one or more software components. The entry includes an identifier of the software component and a diagnostic content indicator associated with the software component. The diagnostic content indicator describes component-specific diagnostic information associated with the software component.

In another embodiment, the method 500 further includes determining that execution of the thread is completed, and deleting the dynamic registry associated with the thread. In another embodiment, the method further includes determining that a triggering event associated with the thread has occurred, collecting diagnostic data for at least one of the one or more software components based on the diagnostic content indicator associated with software component, and storing dump information including the collected diagnostic data in a central repository.

In another embodiment, collecting diagnostic data for at least one of the one or more software components includes collecting diagnostic data for a subset of the one or more software components. In another embodiment, the subset is determined based upon a prioritization scheme. For example, in an embodiment the prioritization scheme prioritizes diagnostic data that is deemed to be of greater importance than other diagnostic data.

In another embodiment, the triggering event includes a failure during execution of the thread. In another embodiment, the diagnostic data further includes one or more of hardware diagnostic information or console logs. In another embodiment, the triggering event includes an anomaly during execution of the thread. In another embodiment, the anomaly is determined based on an artificial intelligence analysis and prediction. In still another embodiment, the anomaly is determined based on machine learning.

In another embodiment, the entry in the dynamic registry for each of the one or more software components further includes an active or inactive status of the software component. In another embodiment, the diagnostic information is collected only for the software components that include an active status. In another embodiment, an active status is set for a software component based on a function call of the software component by the thread. In another embodiment, an inactive status is set for a software component based on a return of a function call to the software component by the thread.

In view of the explanations set forth above, readers will recognize that the benefits of dynamic registration of software components for diagnosis of root cause of failure according to embodiments of the present invention include:

Improvement of first failure data capture (FFDC) so that system support does not require returning to a client or customer for a recreate procedure to gather more information, thus preventing customer outages. Accordingly, the number of recreates needed is reduced and serviceability is improved.

Improves FFDC by providing a complete profile of software components and their interactions for determining which diagnostic data is required.

Automates collection of required diagnostic data for multi-component issues, thereby eliminating the need for a subject matter expert to analyze and determine which data needs to be collected to solve a problem.

Reduces debug time for testing and development cycles.

Substantially improves the completeness of diagnostic data collected by recovery processing for a failure.

Eliminates the need for customers to make decisions regarding which subsystems/components are required to be dumped for debug operations. Accordingly, expediency and accuracy in debug operations are improved.

Exemplary embodiments of the present invention are described largely in the context of a fully functional computer system for dynamic registration of software components for root cause of failure diagnosis. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for dynamic registration of software components for diagnosis of root cause of failure, the method comprising:
   determining a start of execution of a thread associated with a process;
   creating, within memory and in real-time, a dynamic registry associated with the thread;
   determining one or more software components associated with execution of the thread;
   creating one or more entries in the dynamic registry for the one or more software components, each entry being created in the dynamic registry for each of the one or more software components, the entry including an identifier of the software component and a diagnostic content indicator associated with the software component, the diagnostic content indicator indicating component-specific diagnostic information associated with the software component and further indicating which component-specific diagnostic data to collect for the associated thread; and
   dynamically updating the one or more entries, in the dynamic registry, during the execution of the thread, wherein dynamically updating the one or more entries includes marking an entry, for a software component, as inactive the software component is no longer active in an execution flow of the thread.

2. The method of claim 1, further comprising:
   determining that execution of the thread is completed; and
   deleting the dynamic registry associated with the thread.

3. The method of claim 1, further comprising:
   determining that a triggering event associated with the thread has occurred;
   collecting diagnostic data for at least one of the one or more software components based on the diagnostic content indicator associated with software component; and storing dump information including the collected diagnostic data in a central repository.

4. The method of claim 3, wherein collecting diagnostic data for at least one of the one or more software components comprises collecting diagnostic data for a subset of the one or more software components.

5. The method of claim 4, wherein the subset is determined based upon a prioritization scheme.

6. The method of claim 3, wherein the triggering event includes a failure during execution of the thread.

7. The method of claim 3, wherein the diagnostic data further includes one or more of hardware diagnostic information or console logs.

8. The method of claim 3, wherein the triggering event includes an anomaly during execution of the thread.

9. The method of claim 8, wherein the software component associated with the anomaly is determined based on an artificial intelligence analysis and prediction.

10. The method of claim 1, wherein the entry in the dynamic registry for each of the one or more software components further includes an active or inactive status of the software component.

11. The method of claim 10, wherein the diagnostic information is collected only for the software components that include an active status.

12. The method of claim 10, wherein an active status is set for a software component based on a function call of the software component by the thread.

13. The method of claim 10, wherein an inactive status is set for a software component based on a return of a function call to the software component by the thread.

14. An apparatus for dynamic registration of software components for diagnosis of root cause of failure, the apparatus comprising a computer processor, a computer memory operatively coupled to the computer processor, the computer memory comprising computer program instructions that, when executed by the computer processor, cause the apparatus to perform:
   determining a start of execution of a thread associated with a process;
   creating, within memory and in real-time, a dynamic registry associated with the thread;
   determining one or more software components associated with execution of the thread;
   creating one or more entries in the dynamic registry for the one or more software components, each entry being created in the dynamic registry for each of the one or more software components, the entry including an identifier of the software component and a diagnostic content indicator associated with the software component, the diagnostic content indicator indicating component-specific diagnostic information associated with the software component and further indicating which component-specific diagnostic data to collect for the associated thread; and
   dynamically updating the one or more entries, in the dynamic registry, during the execution of the thread, wherein dynamically updating the one or more entries includes marking an entry, for a software component, as inactive when the software component is no longer active in an execution flow of the thread.

15. The apparatus of claim 14, wherein the computer instructions further cause the apparatus to perform:
   determining that execution of the thread is completed; and
   deleting the dynamic registry associated with the thread.

16. The apparatus of claim 14, wherein the computer instructions further cause the apparatus to perform:

determining that a triggering event associated with the thread has occurred;

collecting diagnostic data for at least one of the one or more software components based on the diagnostic content indicator associated with the software component; and storing dump information including the collected diagnostic data in a central repository.

17. The apparatus of claim 16, wherein collecting diagnostic data for at least one of the one or more software components comprises collecting diagnostic data for a subset of the one or more software components.

18. A computer program product for dynamic registration of software components for diagnosis of root cause of failure, the computer program product disposed upon a computer readable medium, the computer program product comprising a non-transitory computer readable medium and computer program instructions that, when executed, cause a computer to perform:

determining a start of execution of a thread associated with a process;

creating, within memory and in real-time, a dynamic registry associated with the thread;

determining one or more software components associated with execution of the thread;

creating one or more entries in the dynamic registry for the one or more software components, each entry being created in the dynamic registry for each of the one or more software components, the entry including an identifier of the software component and a diagnostic content indicator associated with the software component, the diagnostic content indicator indicating component-specific diagnostic information associated with the software component and which component-specific diagnostic data to collect for the associated thread; and dynamically updating the one or more entries, in the dynamic registry, during the execution of the thread, wherein dynamically updating the one or more entries includes marking an entry, for a software component, as inactive when the software component is no longer active in an execution flow of the thread.

19. The computer program product of claim 18, wherein the computer readable medium comprises a storage medium.

\* \* \* \* \*